(12) United States Patent
Moore

(10) Patent No.: US 10,234,276 B2
(45) Date of Patent: *Mar. 19, 2019

(54) METHODS AND SYSTEMS FOR MEASUREMENT AND INSPECTION OF TUBULAR GOODS

(71) Applicant: U. S. Steel Tubular Products, Inc., Spring, TX (US)

(72) Inventor: Peter W. Moore, Houston, TX (US)

(73) Assignee: U. S. STEEL TUBULAR PRODUCTS, INC., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/015,891

(22) Filed: Jun. 22, 2018

(65) Prior Publication Data
US 2019/0017809 A1    Jan. 17, 2019

Related U.S. Application Data

(63) Continuation of application No. 15/648,225, filed on Jul. 12, 2017, now Pat. No. 10,054,425.

(60) Provisional application No. 62/361,190, filed on Jul. 12, 2016.

(51) Int. Cl.
*G01B 11/10* (2006.01)
*G01B 11/12* (2006.01)

(52) U.S. Cl.
CPC ............ *G01B 11/105* (2013.01); *G01B 11/12* (2013.01)

(58) Field of Classification Search
CPC .............................. G01B 11/105; G01B 11/12

USPC ............................................................ 356/612
See application file for complete search history.

(56) References Cited

U.S. PATENT DOCUMENTS

| | | | |
|---|---|---|---|
| 4,912,683 A | | 3/1990 | Katakhara et al. |
| 5,007,291 A | * | 4/1991 | Walters ............... G01N 29/043 226/176 |
| 5,030,911 A | * | 7/1991 | Lam .................... G01N 27/9013 324/220 |
| 5,313,837 A | * | 5/1994 | Haynes ................ G01N 29/265 73/622 |
| 6,745,136 B2 | | 6/2004 | Lam et al. |
| 6,862,099 B2 | * | 3/2005 | Lam ....................... G01B 11/08 250/559.24 |
| 6,931,748 B2 | * | 8/2005 | Lam ....................... G01B 7/281 33/542 |
| 9,170,089 B2 | * | 10/2015 | Logan ................... G01B 11/00 |

(Continued)

FOREIGN PATENT DOCUMENTS

WO    WO 2015/112839 A1    7/2015

*Primary Examiner* — Roy M Punnoose
(74) *Attorney, Agent, or Firm* — K&L Gates LLP

(57) ABSTRACT

Methods and systems for efficient and accurate inspection of tubular goods are disclosed. Inner and outer diameter measurements of a tubular good along the entire length are obtained using laser or other light measurement systems. Discrete sections of a tubular good can be identified. For each section, at least one measurement of an outer diameter of an outside surface of the discrete section, and at least one measurement of an inner diameter of an inside surface of the discrete section are obtained. In addition, a geometric center coordinate for each discrete section of the tubular good is obtained. The measurements defining the outside surface, inside surface, and geometric center in association with the longitudinal position of each discrete section are recorded.

26 Claims, 8 Drawing Sheets

(56) References Cited

U.S. PATENT DOCUMENTS

| | | | |
|---|---|---|---|
| 9,335,146 B1* | 5/2016 | Goldberg | G01B 5/20 |
| 9,725,250 B2* | 8/2017 | Thomas | E21B 37/00 |
| 2004/0016139 A1* | 1/2004 | Lam | G01B 7/281 |
| | | | 33/544 |
| 2008/0257049 A1 | 10/2008 | Sfeir et al. | |
| 2011/0235057 A1 | 9/2011 | Storksen et al. | |

* cited by examiner

US 10,234,276 B2

METHODS AND SYSTEMS FOR MEASUREMENT AND INSPECTION OF TUBULAR GOODS

CROSS-REFERENCE TO RELATED APPLICATIONS

This Application claims the benefit under 35 U.S.C. § 120 of U.S. application Ser. No. 15/648,225, filed Jul. 12, 2017, which in turn claims the benefit under 35 U.S.C. § 119(e) of U.S. Provisional Application No. 62/361,190, filed Jul. 12, 2016. The contents of both applications are hereby incorporated by reference herein in their entireties.

BACKGROUND

Full length and circumferential dimensional measurement of tubular goods, and storage of the numerical results in a data base array maintaining an association between each circumferential plane of data and its longitudinal position, represents the state of the art in tubular good inspection systems. A goal of such systems is to use the data to reconstruct a virtual three-dimensional representation of a tubular good, including off-axis deviations along its length. Typical state-of-the-art tubular good inspection systems directed to this goal presently use ultrasonic testing (UT) means to measure wall thickness dimensions, combined with laser or light emitting apparatus to measure the associated outer diameters. Those current systems, however, do not capture off-axis deviations from the baseline longitudinal straightness of the tubular good.

Such data arrays of wall thickness and associated outer diameter measurements produce pseudo (virtual) three-dimensional representations of short (typically one-half inch) sections of a pipe or other tubular good at discrete longitudinal positions. Each adjacent ring section is characterized by its own independent, discrete set of three-dimensional data, and the only relative measure between adjacent discrete sections is the longitudinal distance between them. When data of this sort is graphically displayed, with all discrete ring sections connected, a perfectly straight three-dimensional representation of a tubular good is produced. In other words, the geometric centerlines of the discrete ring sections align themselves along the longitudinal z-axis and do not deviate radially in the transverse x-y plane.

Manufactured pipes, however, are never perfectly straight and have sections that are radially offset in the transverse x-y plane. When the geometric centers of each section of a manufactured pipe are measured and displayed graphically, off-axis hooks (end area deviations), sweeps (full length bows), and helical out-of-straightness patterns are often observed. The tubular good dimensional measurement systems in use today do not address the off-axis relational data that is needed to produce true three-dimensional representations of manufactured pipes, which exhibit complex off-axis straightness imperfections.

The cost to inspect pipe, for example, with the intent of capturing wall thickness and associated outside diameter dimensions is a function of several factors, including the cost of the measurement apparatus, the cost of the systems used to store and process the generated data arrays for each pipe, the time required to complete the full inspection process, the manpower and training required to operate the systems, and the cost to maintain the measurement system and the data storage and processing system. Typical retail prices for inspecting a small quantity of pipe range from $900 to $1,200 per joint of oil country tubular casing. Large quantity retail prices are approximately $300 per joint. With respect to maintenance, ultrasonic inspection facilities with large transducer arrays are typically employed to measure oil country tubular goods, which significantly increases maintenance costs. Inspection costs can significantly increase the cost of tubular goods.

In the oil drilling industry, mechanical, multi-arm, spider-like devices are used to physically measure and log the inside diameters of a tubular good along its entire length. In other industries, such as the defense industry, laser measurement systems are used to measure the inside diameter of a tubular artillery canon barrel along its entire length. Each of these systems is far less expensive than a full length ultrasonic wall measurement system and can complete a full length inspection in a fraction of the time. Each such system, however, is not able to address the drawbacks of conventional systems which do not capture off-axis deviations from a base line of true straightness or, in some cases, the other remaining tubular dimensions.

FIGURES

Certain features of various non-limiting embodiments according to the present disclosure are set forth with particularity in the appended Examples. The various embodiments, however, both as to organization and methods of operation, together with advantages thereof, may be better understood by reference to the following description, taken in conjunction with the accompanying drawings as follows.

DESCRIPTION

Figure 1:
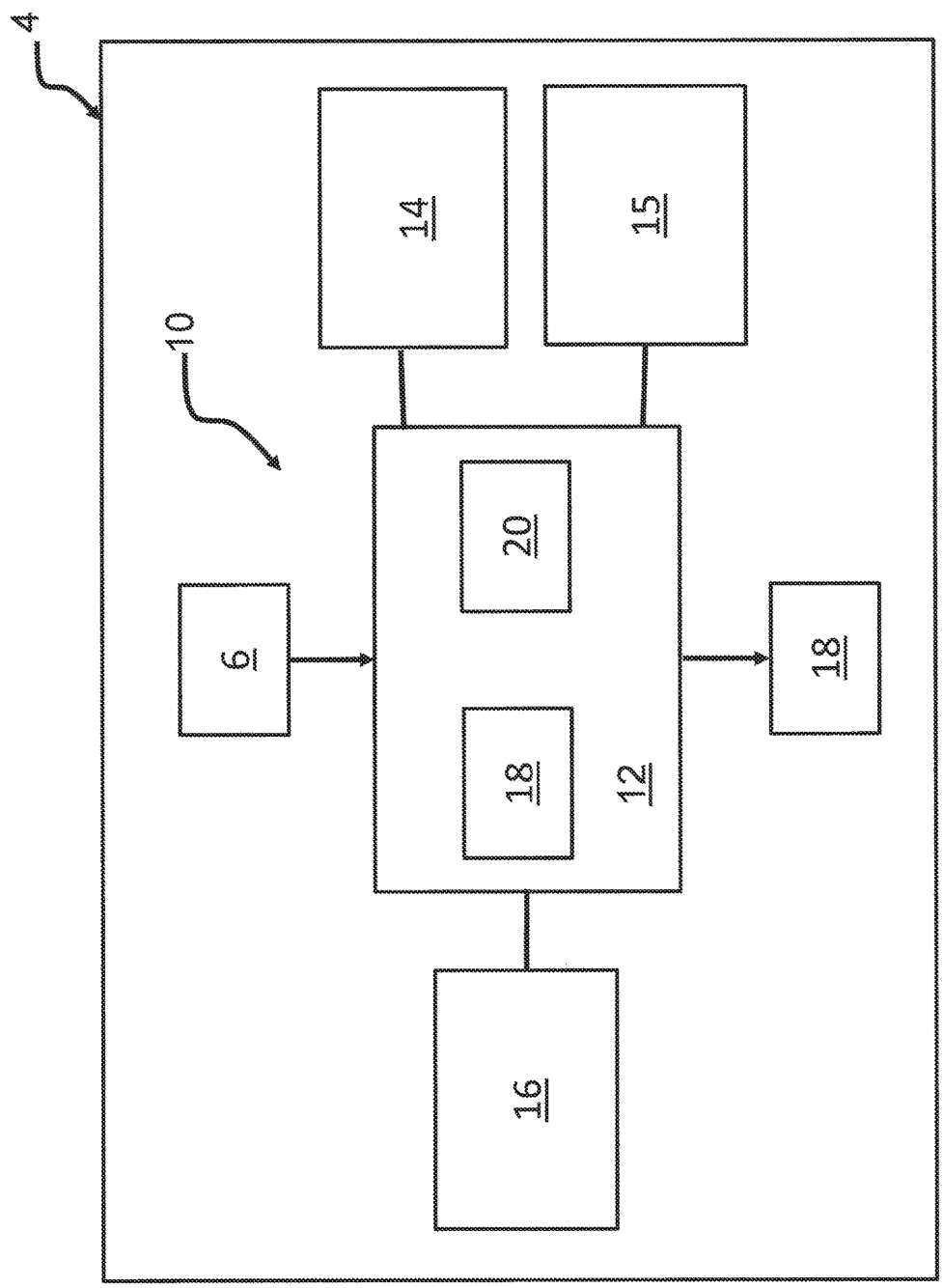
FIG. 1 is a block diagram of an inspection system in accordance with at least one embodiment according to the present disclosure.

Numerous specific details are set forth to provide a thorough understanding of the overall structure, function, manufacture, and use of certain embodiments as described in the specification and illustrated in the accompanying drawings. Well-known operations, components, and elements have not been described in detail so as not to obscure the embodiments described in the specification. The reader will understand that the embodiments described and illustrated herein are non-limiting examples, and thus it can be appreciated that the specific structural and functional details disclosed herein may be representative and illustrative. Variations and changes thereto may be made without departing from the scope of the Examples.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a system, device, or apparatus that "comprises," "has," "includes," or "contains" one or more elements possesses those one or more elements, but is not limited to possessing only those one or more elements. Likewise, an element of a system, device, or apparatus that "comprises," "has," "includes," or "contains" one or more features possesses those one or more features, but is not limited to possessing only those one or more features.

Various non-limiting methods and systems for efficient inspection of tubular goods are disclosed herein. In at least one aspect, wall thickness measurements of a tubular good along an entire length and circumference of the tubular good are obtained by calculations involving the outside and inside diameter dimensions which are measured by laser or other light measurement systems. Discrete ring-shaped sections of a tubular good can be identified. For each such discrete section, at least one measurement of an outer diameter of an outside surface of the discrete section, and at least one measurement of an inner diameter of an inside surface of the discrete section are obtained. In addition, a geometric center coordinate for each discrete section of the tubular good is obtained. The measurements defining the outside surface, inside surface, and geometric center in association with the longitudinal position of each discrete section are recorded.

Each measurement of the outer and inner diameters and associated geometric center can represent a small fraction of the total respective diameters and geometric centers of the tubular good in three-dimensional space. A number of such measurements can be utilized to create a virtual three-dimensional form of the tubular good including straightness anomalies, whether longitudinal or helical in nature.

In at least one aspect, the outer diameters, inner diameters, and/or geometric centers of the discrete sections of the tubular good can be visually represented or displayed so that anomalies of interest, including straightness anomalies, for example, may be readily detected. In one example, the outer diameters, inner diameters, and/or geometric centers of the discrete sections can be graphically represented. In one example, different shades or colors may represent different values of the outer diameters, inner diameters, and/or geometric centers of the discrete sections. For example, a darker shade can represent a greater inner diameter and a lighter shade may represent a smaller inner diameter.

In at least one possible aspect, the recorded values of the outer diameters, inner diameters, and/or geometric centers of the discrete sections of the tubular good may be processed to obtain a virtual wall thickness of the tubular good along its length and/or predict effects of stressors on the tubular good such as, for example, stressors that may be encountered when the tubular good is in service.

In at least one aspect, the present disclosure relates to non-destructive measurement of tubular goods. For example, in at least one aspect, non-destructive methods and systems are used to determine outside diameters, inside diameters, geometric centers, and/or wall thicknesses of steel pipe or other tubular goods by use of laser or other light measurement apparatus. In at least one aspect, the present disclosure relates to an improved method of collecting, storing, displaying, and otherwise utilizing information derived from laser or other light measurement systems to capture dimensional data and calculate and store wall thickness data for a tubular good. In at least one aspect, the present disclosure relates to the use of laser or other light measurement systems to acquire incremental data representing small, discrete sections of the outside and inside tubular surfaces in association with three-dimensional positional data pertaining to each small, discrete section, so that the wall of a tubular, or substantiality tubular, structure, or portions thereof, can be displayed, imaged, examined, and/or utilized in simulative/comparative programs as a three-dimensional object.

In various instances, a method for generating a virtual three-dimensional profile of a tubular, or at least substantially tubular, structure, or region(s) thereof, includes selecting diametric sections of the tubular structure at discrete positions along a predetermined length of the tubular structure. In one aspect, the predetermined length can be the entire length of the tubular structure. The method further includes determining, for each section, a plurality of outer diameters of an outside surface of the section, and a plurality of inner diameters of an inside surface of the section. The number of inner diameters and outer diameters measured represents a desired resolution of the selected section. The method further includes determining a geometric center coordinate for each of the sections. The method further includes employing the determined inner diameters, outer diameters, and corresponding geometric center coordinates to create a virtual three-dimensional profile of the tubular good including, for example, surface anomalies.

Referring to FIG. 1, an inspection system 4 for inspecting a tubular structure 8 is depicted. The tubular structure 8 can, for example, be an oil country tubular good such as a pipe, as illustrated in FIGS. 2-6. The system 4 includes a circuit 10. The circuit 10 includes a controller 12, an outer unit 14, a middle unit 15, and an inner unit 16. The controller 12 may comprise one or more processors 18 (e.g., microprocessor, microcontroller) coupled to at least one memory circuit 20. At least one memory circuit 20 stores machine executable instructions that, when executed by the processor 18, cause the processor 18 to perform one or more functions. In one aspect, the at least one memory circuit 20 stores machine executable instructions that, when executed by the processor 18, cause the processor 18 to generate a virtual three-dimensional profile of a tubular structure 8 based on input data from the inner unit 16, the middle unit 15, and the outer unit 14.

The steps performed by the processor 18 may include selecting discrete diametric sections of the tubular structure 8 at discrete positions along a predetermined length of the tubular structure 8. In one aspect, the predetermined length can be the entire length of the tubular structure 8 or a portion thereof. The steps performed by the processor 18 may further include determining, for each diametric section, a plurality of outer diameters of an outside surface of the section, and a plurality of inner diameters of an inside surface of the section. The number of inner diameters and outer diameters determined for a discrete section represent a desired resolution of the selected section. The steps performed by the processor 18 may further include determining geometric center coordinates for each of the sections and using wall measurements provided by the middle unit 15 to calibrate the orientation and position of the outer diameters with respect to the inner diameters and to correct for any errors of frictional slippage of the tubular structure 8 as it moves through the outer unit 14, middle unit 15, and inner unit 16. The method further includes employing the determined inner diameters, outer diameters, and corresponding geometric center coordinates of the multiple analyzed sections of the tubular structure 8 to create a virtual three-dimensional profile of the tubular structure 8.

In various instances, one or more of the various steps described herein can be performed by a finite state machine comprising either a combinational logic circuit or a sequential logic circuit, wherein either the combinational logic circuit or the sequential logic circuit is coupled to at least one memory circuit. At least one memory circuit stores a current state of the finite state machine. The combinational or sequential logic circuit is configured to cause the finite state machine to perform the steps. The sequential logic circuit may be synchronous or asynchronous. In other instances, one or more of the various steps described herein can be performed by a circuit that includes a combination of the processor 18 and the finite state machine, for example.

The controller 12 and/or other controllers of the present disclosure may be implemented using integrated and/or discrete hardware elements, software elements, and/or a combination of both. Examples of integrated hardware elements may include processors, microprocessors, microcontrollers, integrated circuits, ASICs, PLDs, DSPs, FPGAs, logic gates, registers, semiconductor devices, chips, microchips, chip sets, microcontrollers, SoC, and/or SIP. Examples of discrete hardware elements may include circuits and/or circuit elements such as logic gates, field effect transistors, bipolar transistors, resistors, capacitors, inductors, and/or relays. In certain instances, the controller 12 may include a hybrid circuit comprising discrete and integrated circuit elements or components on one or more substrates, for example.

The processor 18 may be any one of a number of single or multi-core processors known in the art. The memory circuit 20 may comprise volatile and non-volatile storage media. In one embodiment, the processor 18 may include an instruction processing unit and an arithmetic unit. The instruction processing unit may be configured to receive instructions from memory circuit 20.

Figure 2:
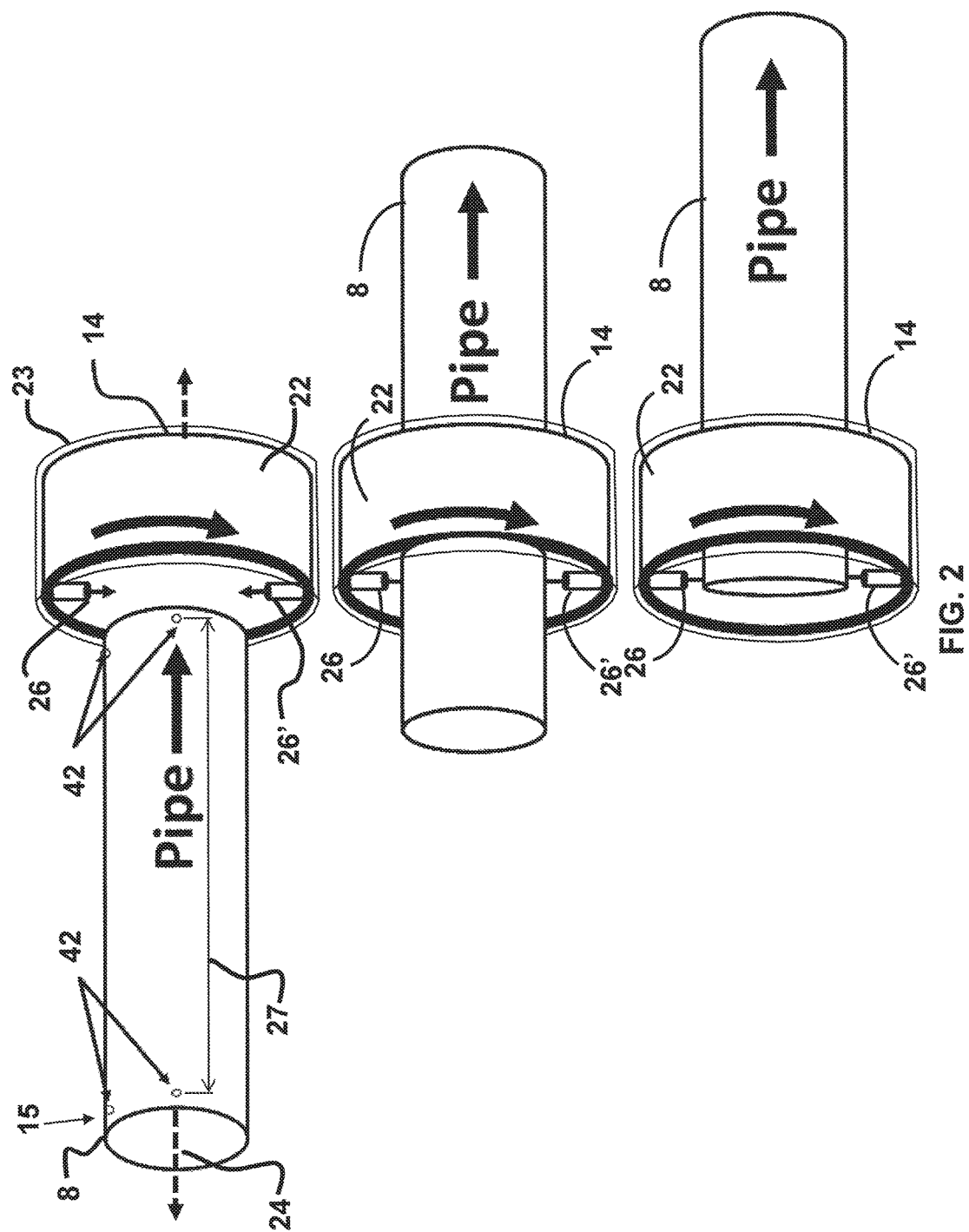
FIG. 2 illustrates a tubular structure being inspected for outer diameter and off-axis dimensions using laser or other light emitting devices and depicts points of direct wall measurement.
Figure 3:
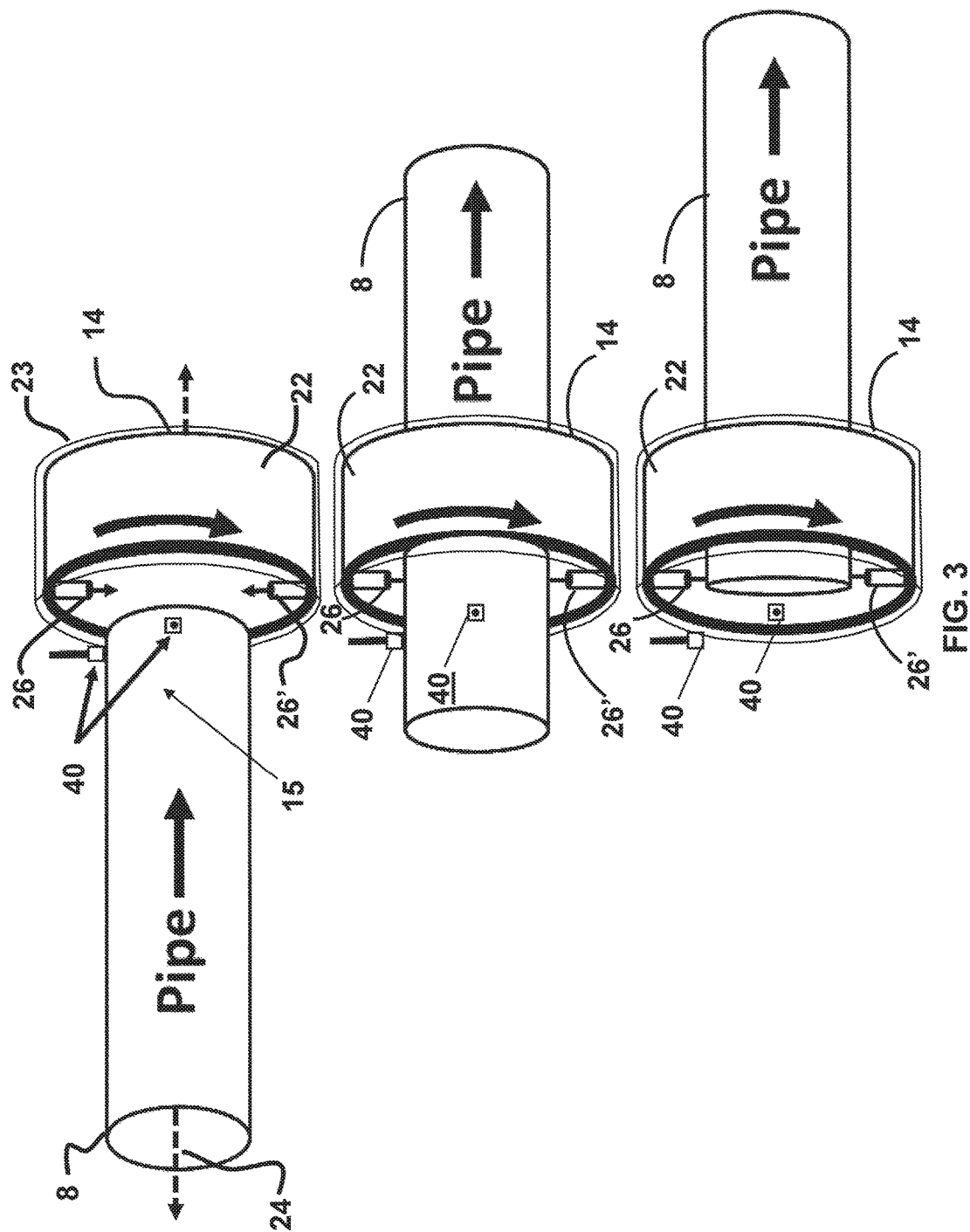
FIG. 3 illustrates a tubular structure being inspected for outer diameter and off-axis dimensions using laser or other light emitting devices and depicts measurement of wall thickness using single trace UT devices.

Referring to FIGS. 2-3, the outer unit 14 includes a rotatable drum 22 which can be configured to rotate about a longitudinal axis 24. The rotatable drum 22 may have a cylindrical shape and a fixed outer shell 23, as illustrated in FIGS. 2-3. One or more laser units can be positioned on an inner wall of the rotatable drum 22. In at least one example, laser units 26, 26' are disposed on opposite sides of an inner wall or face of the rotatable drum 22. The laser units 26 and 26' are circumferentially disposed on the inner wall or face of the rotatable drum 22 at angles of 90° and 270°. Said another way, the laser units 26, 26', as a set, may be circumferentially spaced apart by about 180° on the inner wall or face of the rotatable drum 22. The laser units 26 and 26' may be oriented toward one another. Additional sets of laser measurement units may be disposed on the inner wall or face of the rotatable drum 22 spaced apart by approximately 180°.

In at least one aspect, the laser units 26, 26' are configured to communicate input data to the controller 12 based on measurements taken by the laser units 26, 26' and additional sets of laser units, if present. The controller 12 may employ the input data from the laser units 26, 26' to determine outer diameter values of the outside surface of tubular structure 8 that are based on the measurements. In certain instances, the measurements comprise gap distances that are simultaneously measured between the laser units 26, 26' and the outside surface of the tubular structure 8 as the tubular structure passes through the rotatable drum 22. The same can be said of any additional sets of non-interfering laser units that may be employed on the inner wall or face of the rotatable drum 22.

Figure 4:
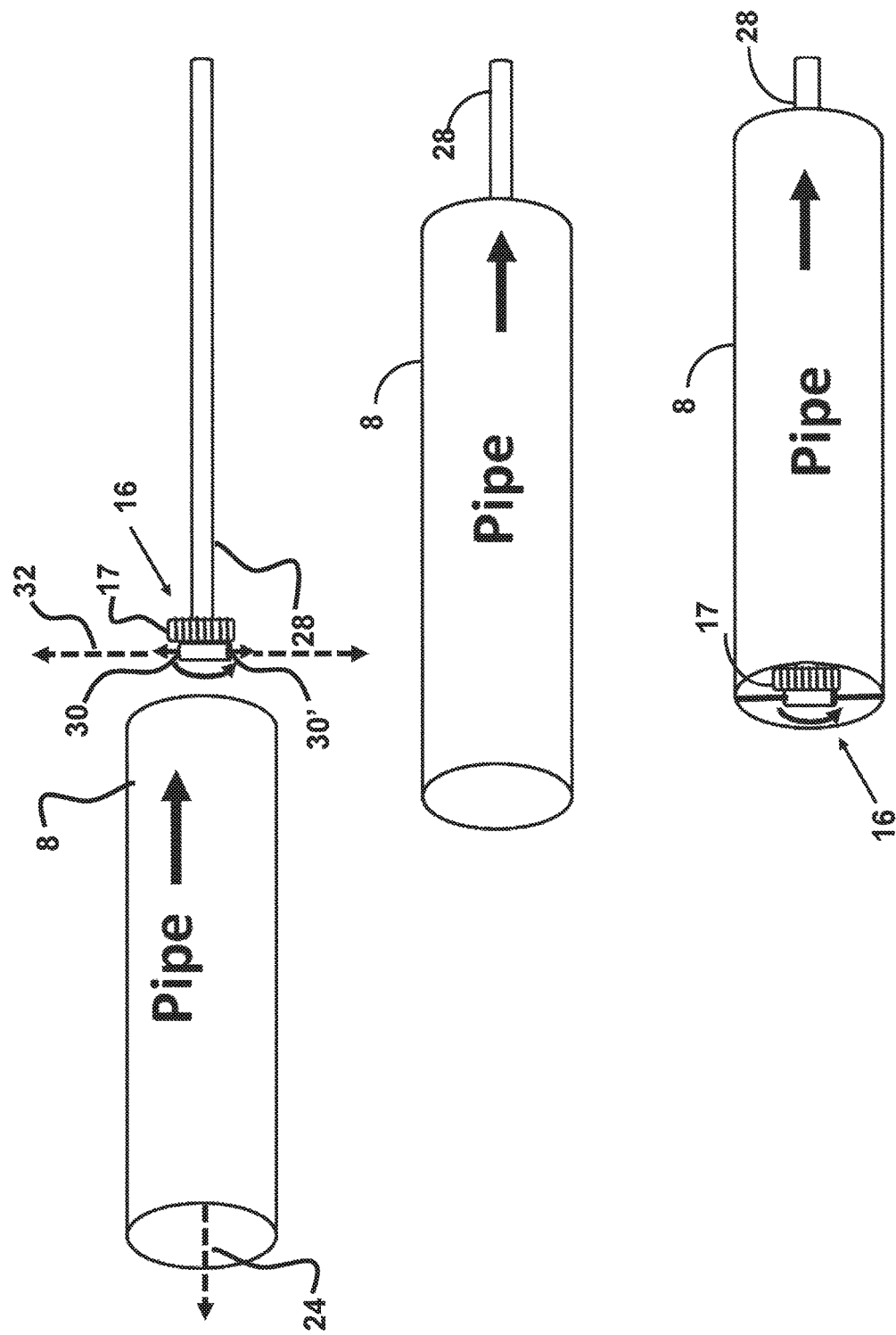
FIG. 4 illustrates a tubular structure being inspected for inner diameter using laser or other light emitting devices attached to a rotary motor mounted on a lance.
Figure 5:
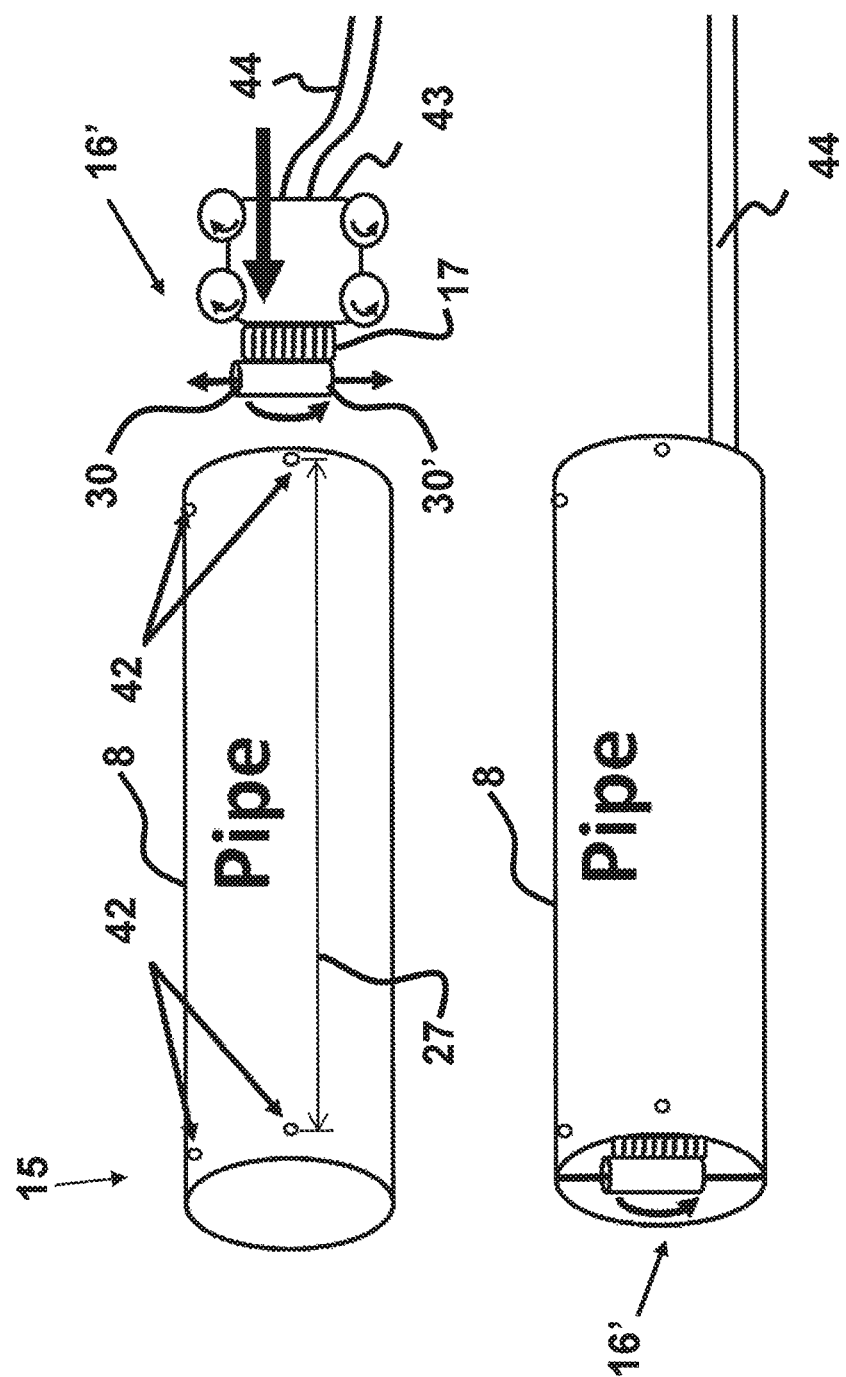
FIG. 5 illustrates a tubular structure being inspected for inner diameter using laser or other light emitting devices attached to a rotary motor mounted on a powered trolley car.

Referring to FIG. 4, the inner unit 16 includes a mounting member 28 in the form of a stationary mandrel, for example, extending along the longitudinal axis 24. Two laser units 30, 30' are affixed to a rotational motor 17 which is attached to and extends from the mounting member 28. In the arrangement illustrated in FIG. 4, the laser units 30, 30' are pointing in opposite directions along an axis 32 that is perpendicular, or at least substantially perpendicular, to the longitudinal axis, and the laser units 30 and 30' are rotating about the longitudinal axis 24. Additional sets of laser measurement units may be affixed to the rotational motor 17 at approximately 180° apart. In another embodiment, as illustrated in FIG. 5, an inner unit 16' can utilize a power driven trolley car 43 that pulls itself and any connecting cables 44 through the interior of the tubular structure 8. In this embodiment the laser units 30, 30' are connected to a rotary motor 17 which in turn is attached to the front of trolley car 43. Additional sets of laser measurement units 30, 30' may be affixed to the rotational motor 17 at approximately 180° apart.

Figure 6:
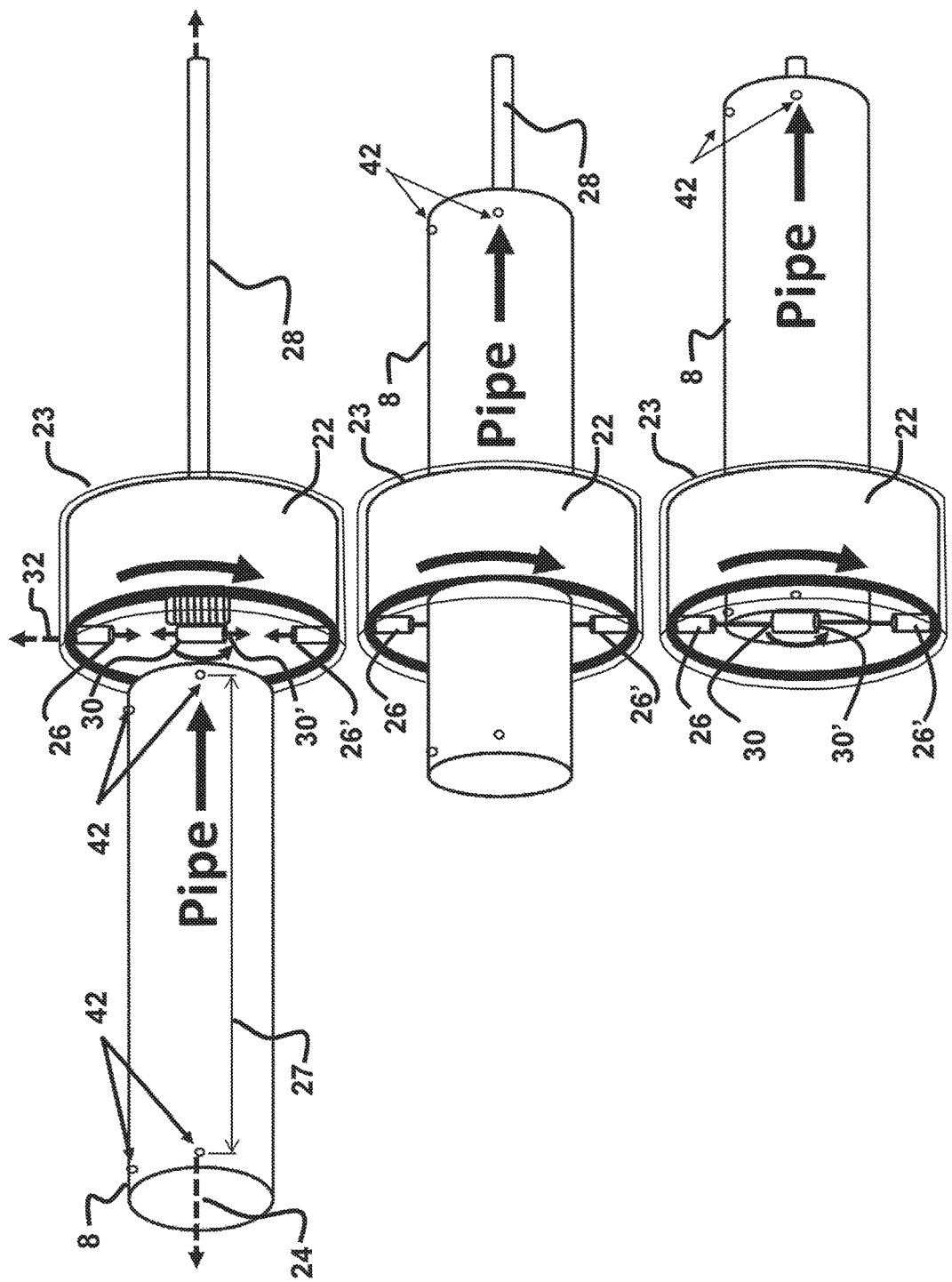
FIG. 6 illustrates a tubular structure being inspected for outer and inner diameter using the combined inspection units shown in FIG. 2 and FIG. 4.

Although outer unit 14 and inner unit 16 can be operated at different stations, in at least one embodiment, illustrated in FIG. 6, the outer unit 14 and the inner unit 16 operate at the same station such that the laser units 26, 26', 30, 30' are aligned with one another along the axis 32. In at least one instance, the mounting member 28 is configured to be centered on the inside of the tubular structure 8 with centering guide flukes or rollers that make contact with the inside wall of the tubular structure 8.

Like the laser units 26, 26', the laser units 30, 30' are configured to communicate input data to the controller 12 based on measurements taken by the laser units 30, 30'. The controller 12 may employ the input data from the laser units 30, 30' to determine inner diameter values of the inside surface of the tubular structure 8 that are based on the measurements taken by the laser units 30, 30'. In certain instances, the measurements comprise gap distances that are simultaneously measured between the laser units 30, 30' and the inside surface of the tubular structure 8.

In operation, a tubular structure 8 is centered around the longitudinal axis 24, as illustrated in FIG. 6. The tubular structure 8 is translated along the longitudinal axis 24 toward the inner unit 16 and outer unit 14 at separate operating stations as illustrated in FIGS. 2-5 or in some combined operating station such as illustrated in FIG. 6. In each of these cases the tubular structure 8 is translated so as to pass between the inner unit 16 and/or outer unit 14. In other words, the tubular structure 8 is configured to move through the outer unit 14 and around the inner unit 16 at separate operating stations or in a single combined station. As the tubular structure 8 is translated axially with respect to the outer unit 14 and inner unit 16, the laser units 26, 26', 30, 30' continuously take their respective measurements of the outside and inside surfaces of the tubular structure 8.

In order to calibrate the measurement data of the outer unit 14 and inner unit 16 in order to adjust for any frictional slippage along the length or rotational slippage about the circumferential direction, the middle unit 15 provides at least two direct wall measurements at approximately 90° apart and at each end of the tubular structure 8 including the longitudinal separation distance 27, as illustrated in FIGS. 2, 5, and 6. In another embodiment, and as illustrated in FIG. 3, the middle unit 15 provides continuous or intermittent wall measurements in two or more lines at approximately 90° apart along the length of the tubular structure 8 as it advances through the outer unit 14. In this embodiment at least two single trace wall measurement devices such as, for example, ultrasonic testing (UT) transducers or other suitable wall sensors are employed. The wall measurement data provided by the middle unit 15 is also used to synchronize the outer diameter and inner diameter data provided by outer unit 14 and inner unit 16 such that a suitably accurate three dimensional relationship of the tubular structure 8 is established and can result in the output of a virtual three-dimensional display or data base of the tubular structure 8 by processor 18.

The user input device 6 can also be employed to enter identification information corresponding to the particular tubular structure 8 to be inspected by the inspection system 4, for example. Other information can also be entered such as, for example, length calibration data, other special calibration data, and the date and time of the inspection. The entered information can be stored in a storage medium such as, for example, the memory circuit 20.

In an alternative embodiment, the inner unit 16 and outer unit 14 can be longitudinally transitioned toward the tubular structure 8 while the tubular structure 8 remains stationary. In such embodiment, the mounting member 28 is configured to longitudinally advance the laser units 30, 30' through the tubular structure 8. In addition, the rotatable drum 22 is configured to longitudinally advance the laser units 26, 26' as they rotate around the tubular structure 8.

Referring again to FIGS. 2-4 and 6, laser units 26, 26', 30, 30' are configured to rotate about the longitudinal axis 24 as the tubular structure 8 is advanced along the longitudinal axis 24 with respect to outer unit 14 and inner unit 16. The laser units 26, 26', 30, 30' can be configured to rotate about the longitudinal axis 24 at the same, or at least substantially the same, rotational speed and rotational direction. Alternatively, laser units 26, 26', 30, 30' can be configured to rotate about the longitudinal axis 24 at different rotational speeds and/or in different rotational directions. During rotation, the laser units 26, 26', 30, 30' continuously take their respective measurements of the outside and inside surfaces of the tubular structure 8.

The speed of rotation of the laser units 26, 26', 30, 30' can also affect the resolution of the virtual three-dimensional profile of the tubular structure 8 that is generated by the controller 12. The greater the speed of the tubular structure 8 relative to the inner unit 16 and outer unit 14, the smaller the number of inner and outer diameters determined by the controller 12 for a defined length of the tubular structure 8. In certain instances, as illustrated in FIG. 1, the circuit 10 includes a user input device 6 which can be used to select a speed of movement of the tubular structure 8 through the inner unit 14 and outer unit 16 corresponding to a desired resolution of the virtual three-dimensional profile of the tubular structure 8. The limiting resolution regardless of traverse speed of tubular structure 8 and the rotational speed of the diameter sensing devices is the maximum electronic repetitive response speed of the overall inspection system 4.

In various embodiments, the outer unit 14 is axially fixed. The laser units 26, 26' obtain their measurements as the tubular structure 8 is translated through the outer unit 14. In addition, the laser units 30, 30' may obtain their measurements as the inner unit 16 progresses within and through the tubular structure 8. Translational and rotational movement of the laser units 30, 30' are tracked by the controller 12.

Figure 7:
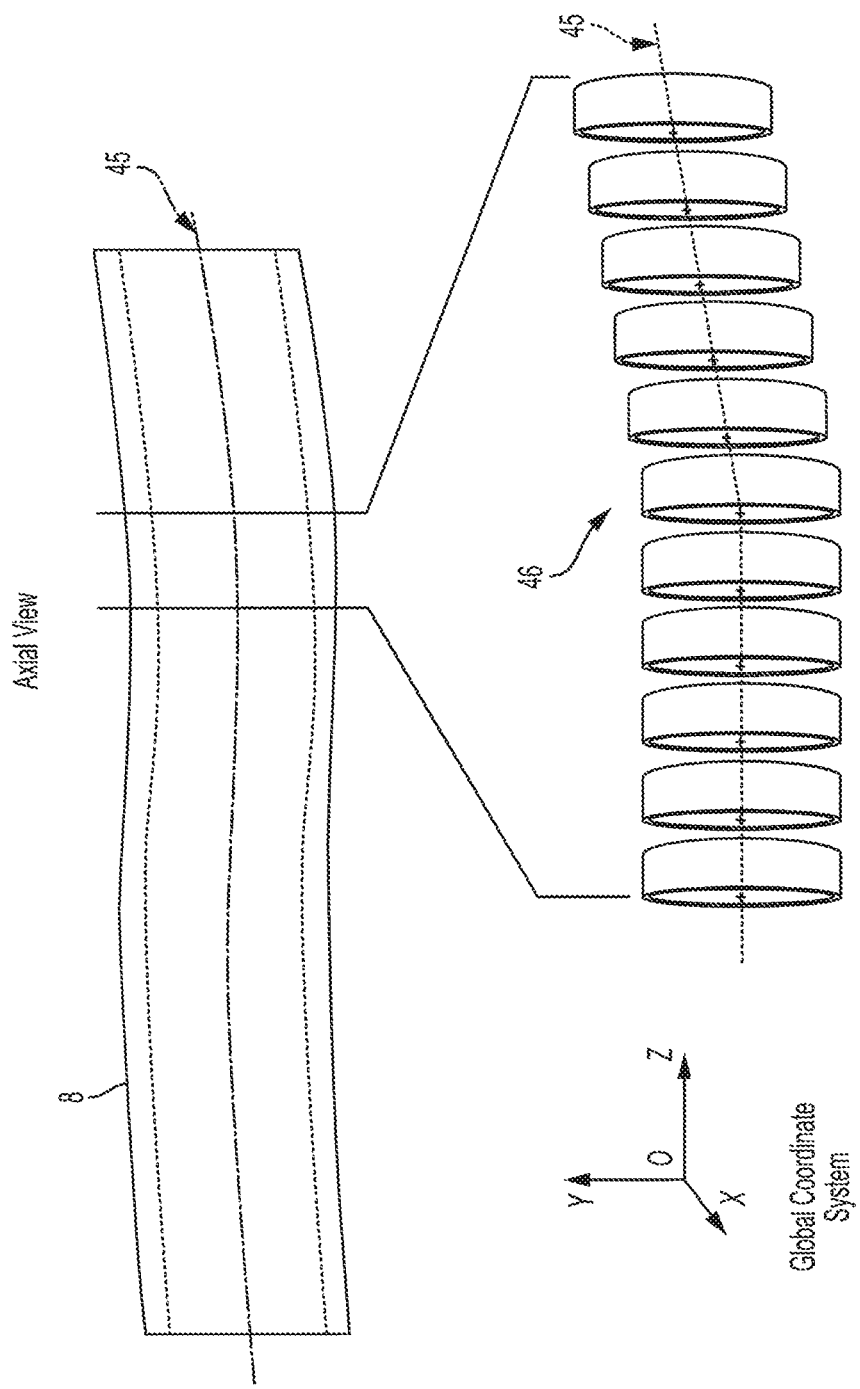
FIG. 7 illustrates a tubular structure and corresponding discrete sections thereof in accordance with at least one non-limiting embodiment according to the present disclosure.
Figure 8:
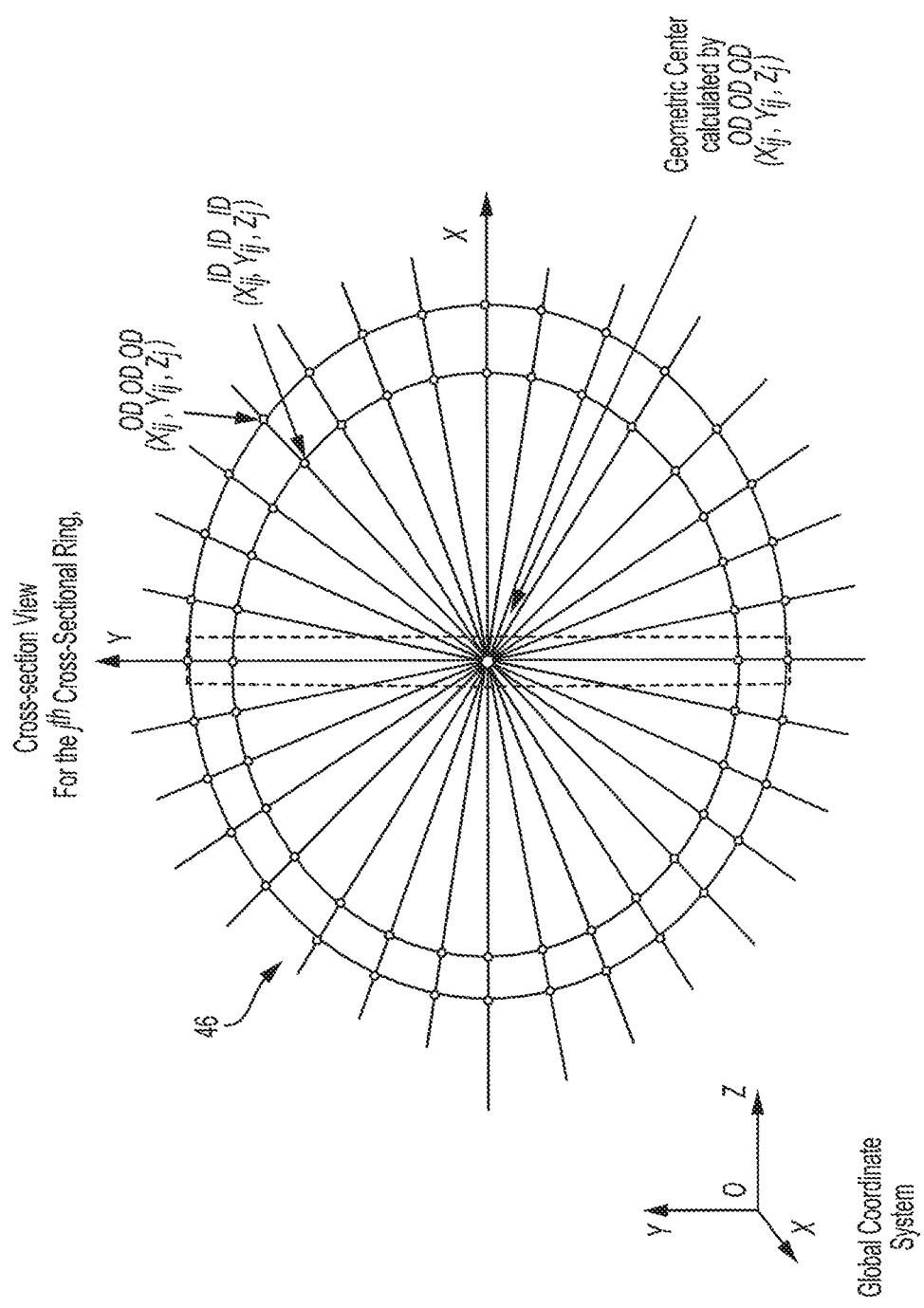
FIG. 8 illustrates one of the discrete sections shown in FIG. 7.

Referring to FIG. 7, a tubular structure 8, or at least a portion thereof, is divided into a number of discrete sequential cross-sections or rings 46 for a desired resolution. The sections or rings 46 can be defined in a plane orthogonal to the longitudinal axis 24. For each ring "j", as illustrated in FIG. 8, an outside surface profile of the ring "j" is plotted based on coordinates $(X_{ij}^{OD}, Y_{ij}^{OD}, Z_{ij}^{OD})$ in a fixed global coordinate system. In addition, an inside surface profile of the ring "j" is plotted based on coordinates $(x_{ij}^{ID}, y_{ij}^{ID}, z_{ij}^{ID})$ in a local coordinate system associated with the inner unit 16. If there are M measurements (rings) along a central axis of the tubular structure 8, and N measurements along the circumferential direction, each one of the outside and inside surfaces is represented by a number of measurements that is equal to the value N multiplied by the value M. The three-dimensional measurements are presented in a fixed global coordinate system, denoted as $(X_{ij}^{OD}, Y_{ij}^{OD}, Z_{ij}^{OD})$ and $(X_{ij}^{ID}, Y_{ij}^{ID}, Z_{ij}^{ID})$ for outside and inside surfaces, respectively, in which i is from 1 to N for the circumferential direction, and j is from 1 to M for the axial direction.

For each ring "j", a geometric center of the outside surface can be determined based on the equation:

$$\begin{cases} X_{Cj}^{OD} = \frac{1}{N}\sum_{i=1}^{N} X_{ij}^{OD} \\ Y_{Cj}^{OD} = \frac{1}{N}\sum_{i=1}^{N} Y_{ij}^{OD} \\ Z_{Cj}^{OD} = Z_{j}^{OD} \end{cases}.$$

Similarly, a geometric center of the inside surface for each ring "j" can be determined based on the equation:

$$\begin{cases} X_{Cj}^{ID} = \frac{1}{N}\sum_{i=1}^{N} X_{ij}^{ID} \\ Y_{Cj}^{ID} = \frac{1}{N}\sum_{i=1}^{N} Y_{ij}^{ID} \\ Z_{Cj}^{ID} = Z_{j}^{ID} \end{cases}.$$

Coordinates of the centerlines of the inside and outside surfaces can then be used to determine the straightness of the tubular structure 8. For an outside surface, coordinates of the centerlines are:

$$(X_{Cj}^{OD}, Y_{Cj}^{OD}, Z_{Cj}^{OD}), j=1,\ldots,M.$$

For an inside surface, coordinates of the centerlines are:

$$(X_{Cj}^{ID}, Y_{Cj}^{ID}, Z_{Cj}^{ID}), j=1,\ldots,M.$$

In various instances, the input data from the laser units 26, 26', 30, 30' are presented in a local coordinate system for each of the insider and outside surfaces. To process the input data, a transformation from the local coordinate system to a fixed global coordinate system is implemented. The transformation can be performed for input data corresponding to the outside and inside surfaces. Once the input data for the outside and inside surfaces are presented in a single global coordinate system, all the geometric properties (e.g., center of circle, diameters, ovality, wall eccentricity, pipe straightness, etc.) can then be calculated accordingly.

For either an outside or inside surface, input data can be presented in a local coordinate system, attached to the laser unit taking the measurements, as:

$$x = \begin{pmatrix} x \\ y \\ z \end{pmatrix}.$$

Through a coordinate transformation (including rotation and translation), the local coordinates can then be presented in a fixed global coordinate system for data points of both of the outer and inner surfaces using the equation:

$$X = Rx + T,$$

wherein global coordinates $$X = \begin{pmatrix} X \\ Y \\ Z \end{pmatrix},$$

translation vector $$T = \begin{pmatrix} X_0 \\ Y_0 \\ Z_0 \end{pmatrix},$$

and rotation matrix:

$$R = R_Z R_Y R_X = \begin{bmatrix} \cos\theta_Z & -\sin\theta_Z & 0 \\ \sin\theta_Z & \cos\theta_Z & 0 \\ 0 & 0 & 1 \end{bmatrix} \begin{bmatrix} \cos\theta_Y & 0 & \sin\theta_Y \\ 0 & 1 & 0 \\ -\sin\theta_Y & 0 & \cos\theta_Y \end{bmatrix} \begin{bmatrix} 1 & 0 & 0 \\ 0 & \cos\theta_X & -\sin\theta_X \\ 0 & \sin\theta_X & \cos\theta_X \end{bmatrix},$$

and wherein $\theta_Z$ is the angle of rotation about the global Z-axis, $\theta_Y$ is the angle of rotation about the global Y-axis, and $\theta_X$ is the angle of rotation about the global X-axis.

In various instances, collapse and other performance properties of the tubular structure 8 for each discrete cross-sectional ring along the full length of the tubular structure 8 can be calculated. Also, entire three-dimensional data can be utilized for three-dimensional modeling to accurately predict collapse strength and other performance properties of a specific tubular structure 8.

Once the three-dimensional coordinates of the outer and inner surfaces of a tubular structure 8 are obtained and stored in a computer storage system, coordinates defining the centers of any discrete section can then be calculated. In general, and with reference to FIG. 7, the three-dimensional coordinates of the centers of all the discrete sections of the entire length of a tubular good form three-dimensional lines and curves 45. By using the method of least squares, one can calculate a reference base line of straightness of the particular tubular structure or portions thereof. In the tubular industry, there is no unique means to define the base reference line for the straightness calculation. The end user may specify the methodology of their preference. Two common scenarios are provided in the American Petroleum Institute (API) Specification 5CT: measurements of full-length straightness (sweep) and end straightness (hook) of a 5-foot end section on both ends of the said tubular. Utilizing the system described herein, not only can the above two common scenarios be evaluated more accurately, but also the full-length three-dimensional shape (such as helical curve) and/or the local bows along the entire length of the tubular good can be measured and visually displayed, and deviations from a reference base line can be provided by digital or graphical output.

Referring to FIG. 3, single trace wall thickness measuring instruments 40 can be incorporated into the inspection system 4 for calibration purposes to ensure that the inside surface profile or shell is placed properly within the outside surface profile or shell. In at least one aspect, two traces, placed outside the rotating drum 22 and approximately 90° apart, are sufficient to lock the inside and outside surface profiles together. Alternatively, the single trace instruments 40 could be positioned in the interior of the rotating drum 22. Examples of suitable single trace instruments 40 include non-overlapping single trace ultrasonic testing (UT), laser-UT, gamma-ray, magnetic and other wall sensing devices. In an alternative embodiment, the single trace instruments 40 could be substituted or used in conjunction with at least four direct wall measurement points 42, two or more at each end of the tubular structure 8 including the longitudinal separation distance 27, as illustrated in FIGS. 2, 5, and 6. In other embodiments, advanced positioning devices, such as a separate straightness reference laser beam or a multi-dimensional gyroscope, can be used to determine the off-axis dimensions with respect to the geometrical center coordinates representing discrete longitudinal sections associated with the outside surface or inside surface circumferential measurements.

EXAMPLES

The following examples describe aspects of several non-limiting embodiments of methods and systems according to the present disclosure.

Example 1

A method of inspecting a tubular good comprises selecting a cross-section of the tubular good that is transverse to a longitudinal axis extending through the tubular good; longitudinally positioning at least one measuring apparatus at a position with respect to the cross-section; while the measuring apparatus is at the position, determining the longitudinal position of the measuring apparatus along the longitudinal axis of the tubular good; while the measuring apparatus is at the position, determining the circumferential position of the measuring apparatus about a circumference of the cross-section; selecting diametric sections in discrete positions around the circumference of the cross-section of the tubular good; measuring an outside diameter and inside diameter at each of the diametric sections around the circumference of the cross-section via the at least one measuring device; determining a geometric center of the cross-section; and repeating the above-listed steps at a plurality of other sections of the tubular good that are orthogonal to the longitudinal axis.

Example 2

The method of Example 1, wherein the measuring device comprises a laser measuring device.

Example 3

The method of Example 1, wherein the measuring device comprises a light measuring device.

Example 4

The method of Example 1, further comprising the step of storing digital recordings of the outer diameters, the inner diameters, and the geometric center of the cross-section.

Example 5

The method of Example 4, wherein the digital recordings comprises first digital recordings configured to define an outer surface of the tubular good, and second digital recordings configured to define an inner surface of the tubular good.

Example 6

The method of on or more of Examples 1-5, further comprising the step of associating the outer surface and the inner surface of the tubular good to calculate a wall of the tubular good in three dimensional space.

Example 7

The method of one or more of Examples 1-6, further comprising the steps of: measuring the relative position and distance of an outer surface geometric center point of an initial section from an inner surface geometric center point of the initial section; and measuring the relative position and distance of an outer surface geometric center point of a last section from the inner surface geometric center point of the last section.

Example 8

The method of one or more of Examples 4-8, further comprising the step of using at least some of the digital recordings to compute the effect of stressors on the calculated wall of the tubular good.

Example 10

The method of Example 1, wherein the discrete positions of the diametric sections are equally spaced around the circumference.

Example 11

A system of inspecting a tubular good, the system comprising: an outer unit comprising at least one outer measuring device; an inner unit comprising at least one inner measuring device; and a control circuit coupled to the outer unit and the inner unit, wherein the control circuit is configured to perform the steps of: selecting a cross-section of the tubular good that transects a longitudinal axis extending through the tubular good; longitudinally positioning the outer unit at a first position outside the cross-section; while the outer unit is at the first position, determining the longitudinal position of the outer unit along the longitudinal axis of the tubular good; while the outer unit is at the first position, determining the circumferential position of the outer unit about a circumference of the cross-section; longitudinally positioning the inner unit at a second position inside the cross-section; while the inner unit is at the second position, determining the longitudinal position of the inner unit along the longitudinal axis of the tubular good; while the inner unit is at the second position, determining the circumferential position of the inner unit about the circumference of the cross-section; selecting diametric sections in discrete positions around the circumference of the cross-section of the tubular good; measuring an outside diameter and inside diameter at each of the diametric sections around the circumference of the cross-section via the at least one measuring device; determining a geometric center of the cross-section; and repeating the above-listed steps at a plurality of other sections of the tubular good that are orthogonal to the longitudinal axis.

Example 12

The system of Example 11, wherein the outer unit comprises a laser measuring device.

Example 13

The system of Example 12, wherein the inner unit comprises a laser measuring device.

Example 14

The system of Example 11, wherein the outer unit comprises a light measuring device.

Example 15

The system of Example 14, wherein the inner unit comprises a light measuring device.

Example 16

The system of Example 11, wherein the control circuit comprises a memory, and wherein the control circuit is configured to store digital recordings of the outer diameters, the inner diameters, and the geometric center of the cross-section in the memory.

Example 17

The system of Example 16, wherein the digital recordings comprise: first digital recordings configured to define an outer surface of the tubular good; and second digital recordings configured to define an inner surface of the tubular good.

Example 18

The system of one or more of Examples 11-17, further comprising the step of associating the outer surface and the inner surface of the tubular good to calculate a wall of the tubular good in three dimensional space.

Example 19

The system of one or more of Examples 11-18, further comprising a middle unit, wherein the control circuit utilizes the middle unit to perform the steps of: measuring the relative position and distance of an outer surface geometric center point of an initial section from an inner surface geometric center point of the initial section; and measuring the relative position and distance of an outer surface geometric center point of a last section from the inner surface geometric center point of the last section.

Example 20

The system of one or more of Examples 14-20, wherein the control circuit is configured to construct a virtual three-dimensional form of the tubular good using at least some of the digital recordings stored in the memory.

Example 21

A method for collection and storage of information representing the outer and inner diameters of a tubular surface, and the associated geometrical centers of the longitudinal section which represent the three-dimensional longitudinal or helical straightness of tubular goods, the method comprising: (a) selecting a diametric section of the circumference of the tubular good about which information representing the outer diameter, inner diameter, and geometric center of the longitudinal section is to be recorded in a format readable by digital computer means; (b) determining number and spacing of diametric sections in discrete positions around the circumference of a longitudinal section of the tubular good which will produce information representing circumferential outside and inside diameters of the tubular good having a determined resolution and a geometric center representing the associated longitudinal section; (c) longitudinally positioning a laser or light measuring apparatus which is capable of measuring the outside diameter and inside diameter at a desired number of adjacent positions around the circumference and measuring the geometric center of each associated longitudinal section of the tubular good in a plurality of adjacent positions in an area of the tubular good to be inspected; (d) while the laser or light measuring apparatus is at the position, determining the longitudinal position of the laser or light measuring apparatus along the axis of the tubular good; (e) while the laser or light measuring apparatus is at the position, determining the circumferential position of the laser or light measuring apparatus about the circumference of the tubular good; (f) while the laser or light measuring apparatus is at the position, causing the laser or light measuring apparatus to determine the outer and inner diameters, and geometric center of a discrete longitudinal section of the tubular good to which the laser or light measuring apparatus is proximate; (g) making a digital recording of outer and inner diameters, geometric center of the section, the longitudinal position, and the circumferential position in an associated relationship; (h) repeating steps (c) through (g) above at a plurality of other circumferential and longitudinal positions of the selected section which have not been previously determined and recorded, until all of the outside and inside diameters representing the determined resolution of the selected section has been determined and recorded, and is represented by a plurality of recordings, each of which represents outer and inner diameter, the outer and inner geometric centers of the section, longitudinal position and circumferential position of a discrete portion of the calculated wall of the tubular good in an associated relationship; and wherein the entire outer surface represented by a plurality of recordings, and the entire inner surface represented by a plurality of different recordings are then further associated in three-dimensional space by measuring: the relative position and distance of the outer surface geometric center point of the initial longitudinal section from the inner surface geometric center point of the initial longitudinal section, and the relative position and distance of the outer surface geometric center point of the last longitudinal section from the inner surface geometric center point of the last longitudinal section.

Example 22

The method of Example 21, wherein the selected section includes outer and inner diameters of the entire tubular surface and associated with the geometric centers throughout the entire longitude of the tubular good and further associated with: the relative position of the initial longitudinal section's outer surface center point with respect to the initial section's inner surface center point, and the relative position of the last longitudinal section's outer surface center point with respect to the last section's inner surface center point.

Example 23

The method of one or more of Examples 21-22, wherein the spacing of the discrete portions within the section of the outer and inner surfaces of the tubular good is such that each determination of outer and inner diameters of each adjacent discrete portion of the section of the outer and inner surface of the tubular is appropriate for the resolution desired, and wherein one geometric center is determined for each longitudinal discrete portion.

Example 24

The method of one or more of Examples 21-23, wherein the number of the discrete portions within the section of the outer and inner surfaces of the tubular good are spaced around the circumference of the tubular to establish the determined resolution.

Example 25

The method of one or more of Examples 21-24, further including the step of causing a digital computer means to use at least some of the information which has been recorded in a digital, computer readable format to compute the effect of stressors on the calculated wall of the tubular good.

Example 26

The method of one or more of Examples 21-25, further comprising the step of causing a digital computer means to use at least some of the information which has been recorded in a digital, computer readable recording to display outer diameters and inner diameters in association with the single geometric center point of each discreet longitudinal section of the tubular good to construct a true virtual three-dimensional form of the full length of the tubular good.

Although the various embodiments of the devices have been described herein in connection with certain disclosed embodiments, many modifications and variations to those embodiments may be implemented. Also, where materials are disclosed for certain components, other materials may be used. Furthermore, according to various embodiments, a single component may be replaced by multiple components, and multiple components may be replaced by a single component, to perform a given function or functions. The foregoing description and the following Examples are intended to cover all such modification and variations.

While this invention has been described as having exemplary designs, the present invention may be further modified within the spirit and scope of the disclosure. This application is therefore intended to cover any variations, uses, or adaptations of the invention using its general principles.

Any patent, publication, or other disclosure material, in whole or in part, that is to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that to be incorporated by reference herein, but which conflicts with existing definitions, statements, or other disclosure material set forth herein will only be incorporated to the extent that no conflict arises between that incorporated material and the existing disclosure material.

What is claimed is:

1. A method of inspecting a tubular good, the method comprising:
    selecting a cross-section of the tubular good that is transverse to a longitudinal axis of the tubular good;
    longitudinally positioning at least one measuring apparatus at a position with respect to the cross-section;
    while the measuring apparatus is at the position, determining the longitudinal position of the measuring apparatus along the longitudinal axis of the tubular good;
    while the measuring apparatus is at the position, determining a circumferential position of the measuring apparatus about a circumference of the cross-section;
    selecting a plurality of diametric sections in discrete positions around the circumference of the cross-section;
    measuring an outer diameter and inner diameter of the tubular good at each of the plurality of diametric sections around the circumference of the cross-section using the at least one measuring device; and
    determining a geometric center of the cross-section.

2. The method of claim 1, wherein the at least one measuring device comprises a laser measuring device.

3. The method of claim 1, wherein the at least one measuring device comprises a light measuring device.

4. The method of claim 1, further comprising storing digital recordings of the outer diameters, the inner diameters, and the geometric center of the cross-section.

5. The method of claim 4, wherein the digital recordings comprise:
    first digital recordings configured to define an outer surface of the tubular good; and
    second digital recordings configured to define an inner surface of the tubular good.

6. The method of claim 5, further comprising associating the outer surface and the inner surface of the tubular good to calculate a wall of the tubular good in three-dimensional space.

7. The method of claim 6, further comprising:
    measuring the relative position and distance of an outer surface geometric center point of an initial section from an inner surface geometric center point of the initial section; and
    measuring the relative position and distance of an outer surface geometric center point of a last section from the inner surface geometric center point of the last section.

8. The method of claim 7, further comprising computing an effect of stressors on the calculated wall of the tubular good using at least some of the digital recordings.

9. The method of claim 8, further comprising constructing a virtual three-dimensional form of the tubular good using one or more of the digital recordings.

10. The method of claim 1, wherein discrete positions of the diametric sections are equally spaced around the circumference of the cross-section.

11. A system for inspecting a tubular good, the system comprising:
    an outer housing comprising at least one outer sensor;
    an inner housing comprising at least one inner sensor; and
    a control circuit coupled to the at least one outer sensor and the at least one inner sensor, wherein the control circuit is configured to:
        select a cross-section of the tubular good transecting a longitudinal axis of the tubular good;
        while the outer housing is at a first position, determine a longitudinal position of the outer housing along the longitudinal axis of the tubular good;
        while the outer housing is at the first position, determine a circumferential position of the outer housing about a circumference of the cross-section;
        while the inner housing is at a second position, different from the first position, determine a longitudinal position of the inner housing along the longitudinal axis of the tubular good;
        while the inner housing is at the second position, determine a circumferential position of the inner housing about the circumference of the cross-section;
        select a plurality of diametric sections in discrete positions around the circumference of the cross-section of the tubular good;
        determine an outer diameter of the plurality of diametric sections based on an output of the at least one outer sensor;
        determine an inner diameter of the plurality of diametric sections based on an output of the at least one inner sensor; and
        determine a geometric center of the cross-section of the tubular good.

12. The system of claim 11, wherein the outer sensor is a laser-emitting device.

13. The system of claim 12, wherein the inner sensor is a laser-emitting device.

14. The system of claim 11, wherein the outer sensor is a light-emitting device.

15. The system of claim 14, wherein the inner sensor is a light-emitting device.

16. The system of claim 11, wherein the control circuit comprises a memory, and wherein the control circuit is configured to store digital recordings of the outer diameters, the inner diameters, and the geometric center of the cross-section in the memory.

17. The system of claim 16, wherein the digital recordings comprise:
    first digital recordings configured to define an outer surface of the tubular good; and
    second digital recordings configured to define an inner surface of the tubular good.

18. The system of claim 17, wherein the control circuit is further configured to associate the outer surface and the inner surface of the tubular good to calculate a wall of the tubular good in three-dimensional space.

19. The system of claim 18, wherein the control circuit is further configured to:
    measure a relative position and distance of an outer surface geometric center point of an initial section from an inner surface geometric center point of the initial section; and
    measure a relative position and distance of an outer surface geometric center point of a last section from the inner surface geometric center point of the last section.

20. The system of claim 18, wherein the control circuit is further configured to construct a virtual three-dimensional form of the tubular good using at least some of the digital recordings stored in the memory.

21. A system of inspecting a tubular good, the system comprising:
an outer housing comprising an outer light-emitting device;
an inner housing comprising an inner light-emitting device; and
a control circuit coupled to the outer and inner light-emitting devices, wherein the control circuit is configured to:
select a cross-section of the tubular good that transects a longitudinal axis extending through the tubular good;
while the outer light-emitting device is at a first position, determine the longitudinal position of the outer housing along the longitudinal axis of the tubular good;
while the outer light-emitting device is at the first position, determine the circumferential position of the outer housing about a circumference of the cross-section;
while the inner light-emitting device is at a second position, different from the first position, determine the longitudinal position of the inner housing along the longitudinal axis of the tubular good;
while the inner light-emitting device is at the second position, determine the circumferential position of the inner housing about the circumference of the cross-section;
select diametric sections in discrete positions around the circumference of the cross-section of the tubular good;
determine an outer diameter of the diametric sections from readings of the outer light-emitting device;
determine an inner diameter of the diametric section from readings of the inner light-emitting device; and
determine a geometric center of the cross-section.

22. The system of claim 21, wherein the control circuit comprises a memory, and wherein the control circuit is configured to store digital recordings of the inner diameters, the outer diameters, and the geometric center of the cross-section in the memory.

23. The system of claim 22, wherein the digital recordings comprise:
first digital recordings configured to define an outer surface of the tubular good; and
second digital recordings configured to define an inner surface of the tubular good.

24. The system of claim 23, wherein the control circuit is further configured to associate the outer surface and the inner surface of the tubular good to calculate a wall of the tubular good in three-dimensional space.

25. The system of claim 24, wherein the control circuit is further configured to:
measure a relative position and distance of an outer surface geometric center point of an initial section from an inner surface geometric center point of the initial section; and
measure a relative position and distance of an outer surface geometric center point of a last section from the inner surface geometric center point of the last section.

26. The system of claim 25, wherein the control circuit is further configured to construct a virtual three-dimensional form of the tubular good using at least some of the digital recordings stored in the memory.

* * * * *